Aug. 19, 1958   C. L. THOMAS   2,848,380
CATALYTIC CRACKING PROCESS AND COMPOSITION
Filed Jan. 26, 1954
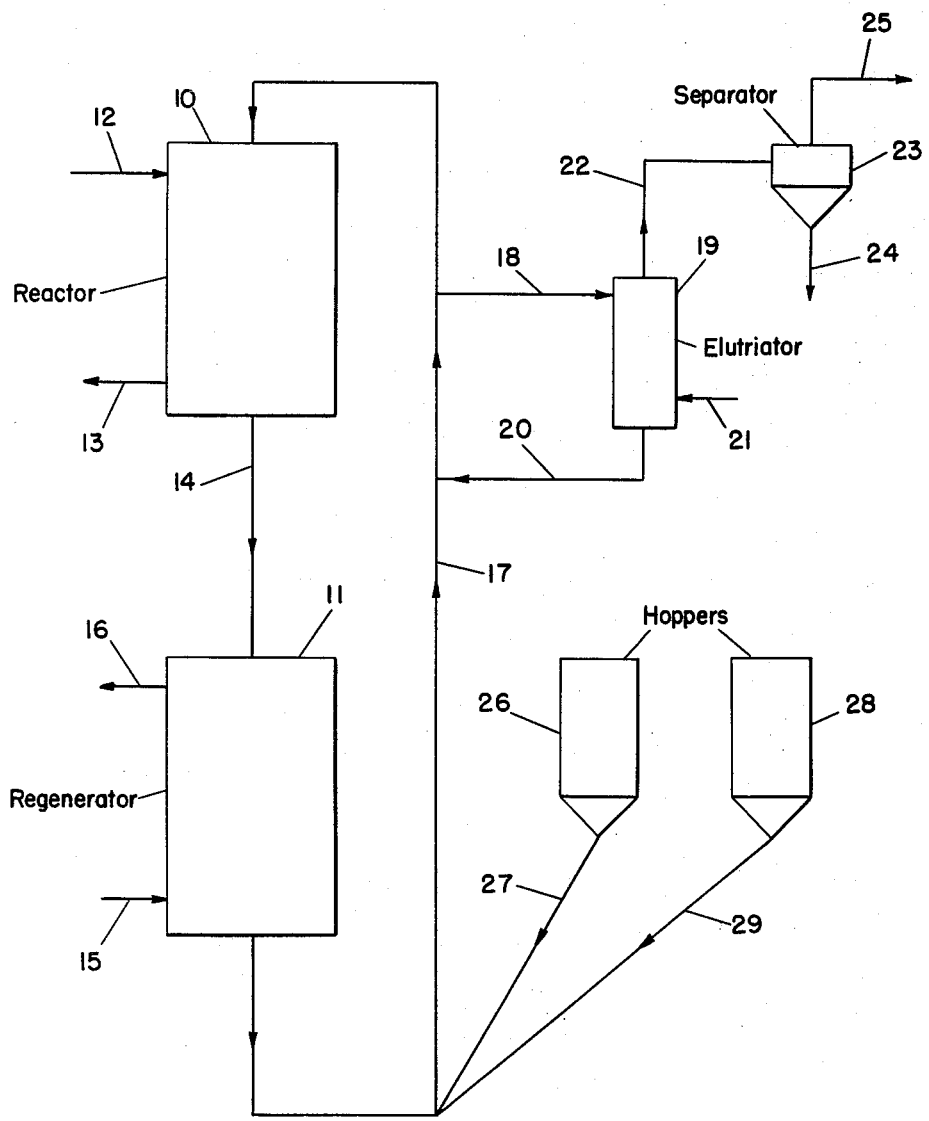
INVENTOR.
CHARLES L. THOMAS
BY
ATTORNEY

United States Patent Office 2,848,380
Patented Aug. 19, 1958

2,848,380

CATALYTIC CRACKING PROCESS AND COMPOSITION

Charles L. Thomas, Swarthmore, Pa., assignor to Sun Oil Company, Philadelphia, Pa., a corporation of New Jersey Application January 26, 1954, Serial No. 406,300

8 Claims. (Cl. 196—52)

This invention relates to catalytic cracking of hydrocarbons and more particularly concerns catalytic cracking operations utilizing a mixed catalytic material of enhanced cracking characteristics.

In the catalytic cracking of petroleum three general types of operations have had widespread commercial use, these being commonly referred to as the fixed bed process, the moving bed process and the fluid catalyst process. In these processes a siliceous catalyst in granular or powdered form generally is employed to effect the cracking reaction. Numerous siliceous cracking catalysts are known for this purpose, the most commonly used catalysts being acid treated alumino-silicate clays of the montmorillonite type and synthetic silica-alumina catalysts Other known siliceous cracking catalysts include synthetic silica-magnesia and silica-zirconia.

It is also known that aluminas such as gamma alumina or bauxite can promote catalytic cracking reactions but that their cracking activity is relatively low compared to the siliceous catalysts. The cracking activity of alumina can be improved by treatment with hydrogen fluoride in gaseous or aqueous form so as to incorporate fluorine therein; but alumina which has been treated in this manner will, when subjected to cracking conditions, rapidly lose its fluorine content with resultant decline in cracking activity. Hence it has not been found to be suitable for commercial application.

I have now found that an unexpected improvement in catalytic cracking activity can be achieved by employing mixtures of a siliceous cracking catalyst and alumina which has been treated with a fluorine compound. According to the invention, an improved catalytic material is provided by admixing with a siliceous catalyst a minor amount of particles of alumina in which fluorine has been absorbed by previous contact with a fluorine-containing compound. The resulting mixture has higher cracking activity than either of its two components, and its gas and coke production factors are both improved as compared to the siliceous catalyst in the absence of the fluorine-containing alumina particles.

The present invention thus provides an improved method of catalytically cracking a hydrocarbon cracking stock, involving contacting the hydrocarbon stock under catalytic cracking conditions with a mixed catalytic material comprising the following components: (1) particles of a siliceous cracking catalyst, including any of the silica-containing compositions known for use as cracking catalyst, which is present in major proportions; and (2) particles of alumina containing fluorine resulting from previous contact or treatment of the alumina with one or more fluorine-containing compounds. The alumina component is present in minor proportion in the catalytic mixture and preferably in amount within the range of 0.5–25% by weight. The invention can be practiced utilizing the fixed bed, moving bed or fluidized catalyst procedures, and the conditions of cracking including temperatures, pressures, space rates, etc., are similar to those employed in conducting such types of operations with conventional siliceous catalysts.

The alumina component of the catalyst mixture is some form of gamma alumina, such as activated alumina or bauxite, which has been contacted with a fluorine-containing material as a result of which it has a substantial fluorine content. For example, the alumina may be treated with either gaseous or aqueous hydrogen fluoride; or it may be contacted at elevated temperatures such as 200–1000° F. with organic fluorides such as methyl fluoride, ethyl fluoride, ethylene difluoride, propyl fluoride, butyl fluorides, hexyl fluorides, or higher molecular weight fluorides. Elemental fluorine itself can be used to treat the alumina for the present purpose. It is desirable that the fluorine content of the alumina be at least 2% and it may vary up to about 50%. In mixing the fluorine-containing alumina with the siliceous cracking catalyst, generally an amount should be added sufficient to provide in excess of 0.1% fluorine by weight based on the mixture. An amount of alumina such that there is about 2–3% fluorine in the mixture is very effective in enhancing the catalytic characteristics, and there generally is no advantage in employing an amount which would result in a fluorine content in excess of 5%. In any event only a minor proportion of alumina is added to the mixture and the proportion of it is adjusted, depending on the fluorine content of the alumina, to attain the catalytic activity desired.

The reason why the catalytic properties of the mixed catalytic material are better than for each of the individual components is not certain, but the improvement is thought to result from a partial transfer of fluorine from the alumina to the siliceous catalyst which occurs at high temperature, e. g. at temperatures above 600° F. A mixture of the two components could, if desired, be prepared then heated, separate from any catalytic cracking operation, to a temperature above 600° F. to effect such transfer of fluorine from the alumina component to the other. Such separate heating step is unnecessary, however, since the desired transfer of fluorine readily occurs under cracking conditions when the catalyst mixture is employed in the cracking step. Hence it is necessary only to have the two components present in the catalytic cracking operation in order to secure the desired improvement in catalytic properties.

In a preferred embodiment of the invention the alumina component for addition to the siliceous catalyst is obtained as a waste produce from another refinery operation wherein alumina or bauxite has been contacted with a fluorine-containing material. For example, in alkylation processes in which hydrofluoric acid is employed as alkylation catalyst, it is customary to remove organic fluorides and/or HF from the alkylate by contacting it in liquid phase at an elevated temperature (e. g. 250–300° F.) with alumina to absorb the fluorine from the hydrocarbon product. The exact form in which the fluorine is absorbed is not certain. The organic fluorides probably are converted at least in part to HF which then reacts with the alumina, and it may be that some of the fluorides are held by adsorption. Regardless of the mechanism, the fluorine is taken up or absorbed by the alumina in a form which is effective for the present purpose. After the alumina has been used for a while in removing fluorine from the alkylate product, it loses its effectiveness for this purpose, at which time it is replaced with fresh alumina. It is customary practice to discard the used alumina as a waste product. By means of the present invention, however, this material becomes very useful and effective as the fluorine-containing alumina for admixture with siliceous cracking catalyst to improve cracking characteristics.

The unexpected effectiveness of the mixed catalytic material prepared according to the invention can be illustrated by results of tests made to determine the cracking characteristics of two blends of such material and also of the two individual components. Cracking activities of these materials were determined in fixed bed operations by the method described on pages R-537 and R-538 of the National Petroleum News, dated August 2, 1944. One of the materials was a commercial silica-alumina cracking catalyst which had become partially spent through previous use in a moving bed catalytic cracking plant. The fluorine-containing alumina was a commercial alumina which had been used to remove fluorine compounds from an alkylate by contacting the hot alkylate in liquid phase and which subsequently had been discarded from such operation. It had a fluorine content of about 29% by weight. These two materials were tested separately and blends of the two containing, respectively, 1% and 10% of the discarded alumina were similarly tested. In each run the charge to the cracking operation was East Texas gas oil, and the cracking temperature was 800° F. Results were as follows:

|  | Siliceous Catalyst | 1% Blend | 10% Blend | Discarded Alumina |
|---|---|---|---|---|
| Gasoline, Vol. Percent | 29.1 | 31.8 | 39.4 | 31.7 |
| Coke, Wt. Percent | 1.72 | 1.80 | 1.90 | 2.14 |
| Gas, Wt. Percent | 3.70 | 3.31 | 4.96 | 2.81 |
| Gas Gravity (air=1) | 1.41 | 1.42 | 1.64 | 1.65 |
| Coke Production Factor [1] | 1.33 | 1.27 | 0.89 | |
| Gas Production Factor [1] | 0.98 | 0.79 | 0.81 | |

[1] These factors are based on a factor of 1.00 for a standard commercial cracking catalyst.

The foregoing data show that the cracking characteristics of the catalyst can be markedly improved by the addition of a relatively small amount of the fluorine-containing alumina. The addition of 10% resulted in a cracking activity (i. e. gasoline yield) far in excess of that which would have been expected from the individual activities of the components. Thus, while the silica-alumina catalyst and the discarded alumina exhibited activities of about 29 and 32 respectively, the blend containing 10% of the discarded alumina had an activity of about 39. Other desirable characteristics of the blend are shown by the coke and gas production factors which are considerably lower than the corresponding factors for the partially spent silica-alumina catalyst alone. The data for the 1% blend further show that the addition of only 1% of the discarded alumina effected a substantial improvement in the catalytic properties.

The runs for each of the four materials tabulated above included four cycles of operation involving on-stream, purge and regeneration periods. During this time there was a transfer of some of the fluorine from the alumina component to the siliceous cracking component. Analysis of the individual components obtained by separating particles from the 10% blend after use indicated that the fluorine content of the alumina component had dropped from about 29% to about 21% by weight and that the silica-alumina component had accumulated a fluorine content of about 1%.

The accompanying sheet of drawings diagrammatically illustrates an embodiment of the invention as applied to a moving bed catalytic cracking operation. In the drawings 10 represents a catalytic reactor and 11 a regenerator through each of which particulate catalytic material passes downwardly in the form of a continuous moving bed. Hydrocarbon cracking stock is supplied to the reactor from line 12 and reaction products are withdrawn through line 13. Means (not shown) for purging the catalyst with steam in the lower part of reactor 10 conventionally should be provided to remove residual hydrocarbons before the catalyst passes through line 14 to regenerator 11. In the regenerator carbonaceous deposits are burned from the catalyst by means of air supplied through line 15, the combustion gases being removed through line 16. The reactivated catalyst is continuously withdrawn from the bottom of regenerator 11 and then circulated back to the top of the reactor as indicated by line 17. This may be done in any conventional or suitable manner such as by using flue gas to lift the catalyst or by means of bucket elevators.

In accordance with the invention the circulating catalytic material comprises discrete particles of a siliceous cracking catalyst admixed with discrete particles of alumina which, as heretofore described, has previously been contacted with a fluorine-containing material. In a circulating system such as this, attrition of the moving solid material inevitably occurs; hence a portion of the catalyst stream is diverted, as indicated by line 18, through an elutriator 19 to remove catalyst fines or dust and then is returned via line 20 to the system. Air is admitted to elutriator 19 through line 21, and it carries the catalyst fines from the top of the elutriator through line 22. The fines are separated from the air stream by a cyclone separator 23 and pass from the bottom of the separator as indicated by line 24, and the dust-free air is withdrawn through line 25.

In operating the system described above, the fluorine supplied by the alumina component of the catlayst mixture tends to gradually migrate from the system through the various effluent streams and thus be lost. In accordance with the invention this is compensated for by the addition, either continuously or intermittently, of further quantities of the fluorine-containing alumina from hopper 26 as indicated by line 27. Addition of this component through line 27 is done as needed to regulate and maintain the catalytic activity at the desired level. Additional quantities of the siliceous cracking component may also be added as required from hopper 28 through line 29 to compensate for attrition and loss of this component in the catalyst fines.

It is characteristic of the alumina component that it is substantially softer than commercial siliceous cracking catalysts; hence it will undergo attrition more rapidly than the siliceous component. This means that the ratio of the alumina component to the siliceous component in the fines withdrawn through line 24 will be higher than such ratio in the circulating catalytic mixture. This is advantageous in that it readily permits the alumina to be supplied from hopper 26 in the amount required to compensate for fluorine loss while avoiding its accretion in the system to an undesirably high level. Thus, the catalytic composition circulating through the system can readily be maintained with the siliceous cracking component in major proportion and with a sufficient proportion of fluorine-containing alumina to secure the desired catalytic characteristics.

While the invention has not been specifically described with reference to the fluid catalyst type of operation, it will be apparent that the principles of the invention as described above are also applicable to that type of catalytic cracking procedure.

I claim:

1. A catalytic cracking material comprising 75–99.5% of particles of silica-alumina cracking catalyst and 0.5–25% of particles of gamma alumina in which fluorine has been absorbed by previous contact with a hydrocarbon stock containing fluorine compounds resulting from previous contact of the hydrocarbon stock with hydrogen fluoride.

2. A catalytic cracking material comprising a major proportion of particles of siliceous cracking catalyst and a minor proportion of particles of fluorine-containing alumina, the fluorine having been derived by contacting the gamma alumina with a hydrocarbon stock containing fluorine compounds resulting from previous contact of the hydrocarbon stock with hydrogen fluoride.

3. A catalytic cracking material comprising a major porportion of particles of siliceous cracking catalyst and a minor proportion of particles of fluorine-containing gamma alumina, the fluorine having been derived by contacting the alumina with a hydrocarbon stock containing fluorine compounds resulting from previous contact of the hydrocarbon stock with hydrogen fluoride, said cracking material having been subjected to a temperature above 600° F.

4. Method of catalytic cracking which comprises contacting a hydrocarbon cracking stock under catalytic cracking conditions with a catalytic material comprising a major proportion of particles of siliceous cracking catalyst and a minor proportion of particles of fluorine-containing gamma alumina, the fluorine having been derived by contacting the alumina with a hydrocarbon stock containing fluorine compounds resulting from previous contact of the hydrocarbon stock with hydrogen fluoride.

5. In a process for catalytically cracking a hydrocarbon stock employing a siliceous cracking catalyst, the step which comprises adding to such catalyst a minor proportion of gamma alumina particles in which fluorine has been absorbed by previous contact with an alkylate stock obtained by alkylation in the presence of hydrogen fluoride.

6. In a catalytic cracking process wherein a granular catalytic mass is continuously circulated through a cracking zone and a regeneration zone, the improvement which comprises circulating through said zones a catalytic mass comprising a siliceous cracking catalyst and adding to the circulating catalyst gamma alumina in which fluorine has been absorbed by previous contact with a hydrocarbon stock containing fluorine compounds resulting from previous contact of the hydrocarbon stock with hydrogen fluoride to maintain a cracking activity higher than that which would be obtained in the absence of said alumina.

7. In a catalytic cracking process wherein a granular catalytic mass is continuously circulated through a cracking zone and a regeneration zone in the form of a moving bed, the improvement which comprises circulating through said zones a catalytic mass comprising a major proportion of siliceous cracking catalyst and a minor proportion of gamma alumina in which fluorine has been absorbed by previous contact with a hydrocarbon stock containing fluorine compounds resulting from previous contact of the hydrocarbon stock with hydrogen fluoride, whereby the catalytic mass has a cracking activity higher than that which would be obtained in the absence of said alumina, and adding to the catalytic mass such fluorine-containing alumina to maintain the higher cracking activity.

8. In a catalytic cracking process wherein a granular catalytic mass is continuously circulated through a cracking zone and a regeneration zone in the form of a moving bed, the improvement which comprises circulating through said zones a catalytic mass comprising a major proportion of silica-alumina cracking catalyst and a minor proportion of gamma alumina in which fluorine has been absorbed by previous contact with a hydrocarbon stock containing fluorine compounds resulting from previous contact of the hydrocarbon stock with hydrogen fluoride, whereby the catalytic mass has a cracking activity higher than that which would be obtained in the absence of said alumina, removing from the catalytic mass fines formed by attrition and comprising a higher ratio of alumina to silica-alumina catalyst than that in the circulating catalytic mass, and adding to the catalytic mass such fluorine-containing alumina to maintain the higher cracking activity.

References Cited in the file of this patent
UNITED STATES PATENTS

| | | |
|---|---|---|
| 2,336,165 | Connolly | Dec. 7, 1943 |
| 2,415,716 | Veltman | Feb. 11, 1947 |
| 2,525,812 | Lien et al. | Oct. 17, 1950 |
| 2,636,845 | Richardson | Apr. 28, 1953 |
| 2,638,453 | Starr | May 12, 1953 |